Nov. 16, 1965 R. B. MASON ETAL 3,217,360
APPARATUS FOR SELECTIVELY CONTROLLING THE
EXTRUSION OF PLASTIC MATERIAL
Filed Nov. 13, 1962 3 Sheets-Sheet 1

INVENTORS
ROBERT B. MASON
BY  RAYMOND E. WINCHESTER, JR.
ROBERT GERALD STRAUSS

Burns, Doane, Benedict, Swecker & Mathis
ATTORNEYS

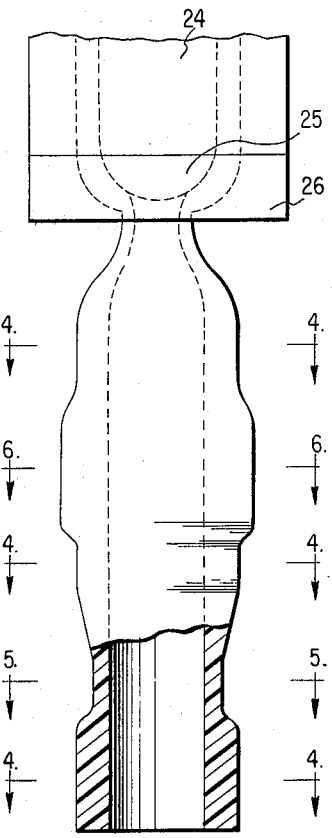
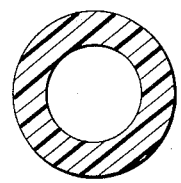
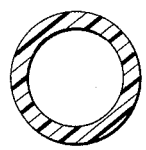
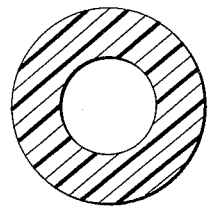
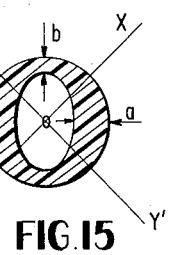
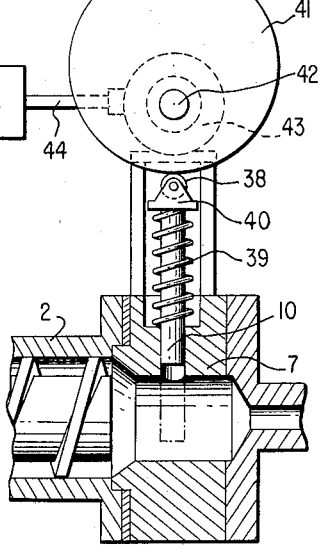
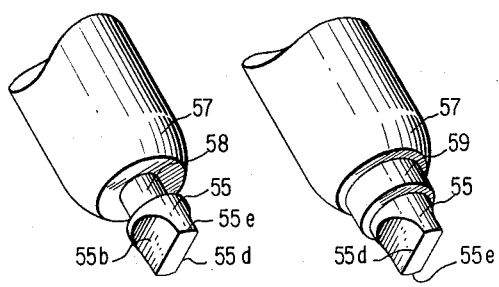

INVENTORS
ROBERT B. MASON
RAYMOND E. WINCHESTER, JR.
ROBERT GERALD STRAUSS

BY

ATTORNEYS

United States Patent Office 3,217,360
Patented Nov. 16, 1965

3,217,360
APPARATUS FOR SELECTIVELY CONTROLLING THE EXTRUSION OF PLASTIC MATERIAL
Robert B. Mason, Mystic, Raymond E. Winchester, Jr., Pawcatuck, and Robert Gerald Strauss, West Hartford, Conn., assignors to Monsanto Company, a corporation of Delaware
Filed Nov. 13, 1962, Ser. No. 236,871
10 Claims. (Cl. 18—14)

This invention relates to a method and apparatus for selectively controlling the extrusion of plastic material. More particularly, it is concerned with unique concepts for deliberately obtaining and controlling variations in the geometric properties of extruded parisons.

In the fabrication of articles from extruded parisons, it is desirable to control the structural nature of the parison in relation to the character of the article to be fabricated and the nature of the fabrication operation. This may entail the modifying of parison portions from the standpoint of such geometric properties as size, shape, and wall thickness.

Where parisons are blow molded to form articles, and where the articles to be formed have different diametered portions, different sections of the parisons will undergo differing degrees of expansion or distortion during the blow molding operation. Heretofore, this has frequently resulted in localized thinning of parison wall portions so as to produce articles having an undesired variation of wall thickness. It has also been true, in certain instances, that the blowing operation resulted in a uniform wall thickness formation where a non-uniform wall thickness formation was desired.

Of particular concern has been the problem of controlling parison size and wall thickness in article portion defining areas desired to be selectively thickened or thinned or in areas subject to mold pinching action which tends to cause flash formation. In general, it is desired to reduce or eliminate the formation of flash so as to avoid a subsequent trimming operation and produce a commercially acceptable and attractive article during the article forming operation itself. To accomplish this objective, it may be necessary to reduce the outside diameter and possibly the inside diameter of the parison in the pinch zones.

Several attempts have been made to vary the structural nature of a parison to accommodate to the requirements of a finished article or a particular molding operation. For example, outside diameter variations have been effected through variations in pressure applied to initiate the flow of plastic from a material source. Such arrangements, however, have presented substantial difficulties, including those entailed in rapidly and controllably transmitting pressure variations to the extrusion orifice.

Where the outside diameter of a parison has been varied through means of variations in feed pressure, a variation in parison wall thickness has resulted which often was undesired. Variations in the internal diameter of a parison have been effected by moving a tip axially with respect to an extrusion orifice so as to vary the position of the wall defining the inner surface of the annular extrusion outlet. Here again, however, the parison wall thickness was varied.

Changes in the geometric shape of a parison have been caused through the utilization of separate tips having different cross-sectional shapes conforming to the desired shape of the parisons to be extruded. Heretofore, where parisons having different geometric shapes were to be formed, the extrusion apparatus was required to be shut down to permit the insertion of a new tip having an appropriate cross-sectional shape. Where a single, stationary tip has been employed, only a single, basic geometrical shape for the parison has been formed, even though variations in the size of this shape have resulted.

In extruding parisons it is often desirable for a reciprocating tip member which defines a parison inner wall to project through an extrusion orifice which defines the parison outer wall. Should it be desirable to effect parison severing while the tip and orifice defining member are thus arranged, there is a distinct likelihood that a severing mechanism, in moving transversely through the parison, will engage the tip member so as to damage either the tip or the severing device.

Recognizing the need for improved techniques for extruding plastic parisons with controlled variations in size, shape and wall thicknesses in pre-selected parison portions, it is an object of this invention to provide apparatus by means of which such improvements may be attained.

Specifically, it is an object of this invention to provide an apparatus by means of which the outside diameter of an extruded parison may be varied without interrupting the feed of plastic material from a source into a continuously open passage communicating with an extrusion outlet.

It is a further object of the invention to provide an apparatus by means of which there may be extruded a parison having axially spaced portions, the cross-sections of which have different geometric properties, without interrupting the extrusion operation.

It is an additional object of the invention to provide an apparatus by means of which a parison may be extruded which has axially spaced portions of different outside diameters and wherein the wall thickness may be controlled in conformance with the requirements of the article to be fabricated.

It is a particular object of the invention to provide an apparatus by means of which there may be extruded a parison having axially spaced portions, the cross-sections of which have different geometric shapes, without interrupting the extrusion operation.

It is also an object of this invention to provide such an apparatus wherein the cross-sectional geometric shape of a parison may be varied without altering the extrusion outlet.

It is also an object of this invention to provide a parison severing mechanism which may be effectively employed while an inner-parison-wall defining tip projects through an outer-parison-wall defining orifice such that there is no possibility of engagement between the severing mechanism and the tip.

In order to vary a parison outside diameter without altering the operation of a plastic feed initiating means, there is envisioned a technique wherein an initial pressure is applied to a mass of plastic material to initiate its flow through a cavity toward an extrusion outlet. An initial pressure is continuously maintained so as to maintain a continuous flow of material entering the cavity. The capacity of the cavity, which continuously remains open, is selectively varied, preferably in the immediate vicinity of the extrusion outlet, so as to vary the rate at which material reaches the extrusion outlet and the pressure at which material is extruded in tubular form therethrough to form a parison.

The dimensions of the outside diameter and wall thickness of a parison may be selectively controlled without altering the operation of the means for applying feed initiating pressure to the plastic material by varying the capacity of the cavity through which the material is transmitted to the extrusion outlet while also varying the position of an inner surface of this outlet. By simultaneously varying the cavity size and the position of an inner surface of the outlet, a parison may be extruded which has portions of different outside diameters but in which wall thickness remains nearly uniform.

In order to selectively vary the geometric shape of portions of a parison without interrupting the extrusion operation, there is employed an orifice defining member in conjunction with a composite tip member mounted for reciprocating axial movement relative to the orifice defined by this member. The composite tip member includes at least one portion of non-circular cross-sectional configuration and at least one other portion of circular cross-sectional configuration.

In practicing this invention, the geometrical shape of a parison may be varied without altering the extrusion outlet by extruding plastic material through an outlet defining an annular opening, at least one quadrant of which has a portion the width of which exceeds that of at least one adjacent quadrant. By varying the pressure at which plastic is extruded through such an outlet while forming a parison, a deliberate and controlled distortion of the parison shape will result.

Inadvertent engagement between a severing mechanism and a tip member is avoided by the provision of wall means which define a cavity extending outwardly from the extrusion orifice. The severing device moves transversely across the outer end of this wall means, in spaced relation with the extrusion orifice, so as to clear a tip member projecting through the orifice into the wall means defined cavity.

In describing the over-all invention, references will be made to preferred embodiments of the apparatus illustrated in the accompanying drawings, in which:

FIGURE 2 illustrates an alternative form of a pressure modifying portion of the apparatus illustrated in FIGURE 1;

FIGURE 3 illustrates parison variations effected during the extrusion of plastic material by the apparatus shown in FIGURE 1;

FIGURE 4 is a cross-sectional parison view taken along any of the section lines 4—4 as shown in FIGURE 3;

FIGURE 5 is a cross-sectional parison view taken along the section line 5—5 of FIGURE 3;

FIGURE 6 is a cross-sectional parison view taken along the section line 6—6 of FIGURE 3;

FIGURE 12 is a sectioned, elevational and schematic showing of the extrusion outlet portion of a modified form of the FIGURE 1 apparatus which enables the obtaining of changes in the geometric shape of axially spaced portions of extruding parisons;

FIGURE 13 is a perspective, fragmentary view of a modified form of the extrusion tip illustrated in FIGURE 12.

FIGURE 14 is a perspective, fragmentary view of another modified form of the extrusion tip shown in FIGURE 12; and FIGURE 15 is a cross-sectional plan view of a parison taken along a section line 15—15 of FIGURE 12.

Figure 1:
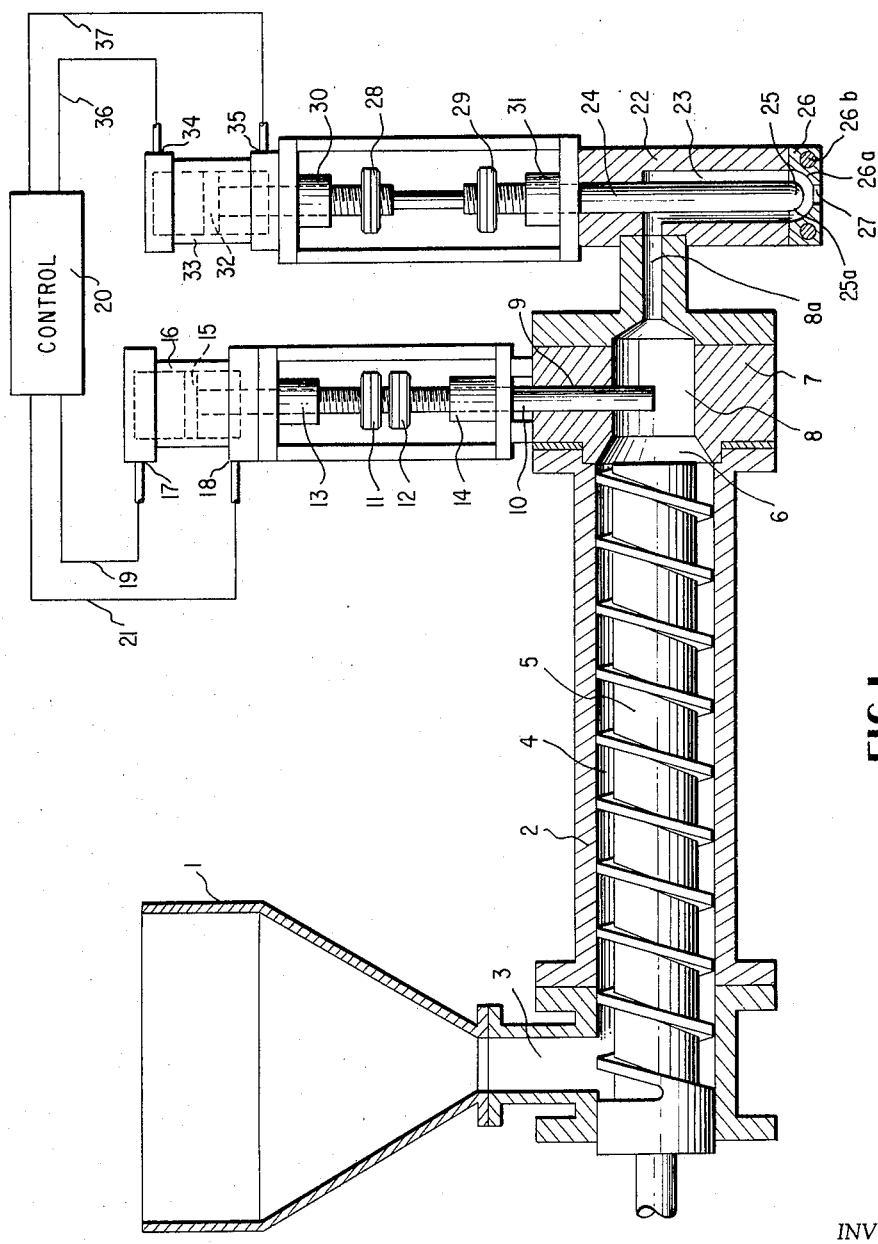
FIGURE 1 is a sectioned, elevational showing of a preferred embodiment of an extrusion apparatus.

The extrusion apparatus illustrated in FIGURE 1 includes a conventional hopper 1 for supplying bulk plastic material to a schematically illustrated, conventional plasticizing and feeding unit 2. Plasticizing unit 2 includes a plastic material inlet 3, an elongate passage 4, a plastic material advancing and pressuring worm screw 5, and an outlet 6. Unit 2 would be surrounded with conventional heating units, not illustrated, to effect the plasticizing of material being advanced through passage 4 by screw 5.

Adjacent outlet 6 of plasticizer unit 2 there is mounted an extrusion pressure modifier 7. Pressure modifier 7 includes a passage 8 defining an extension of plasticizer passage 4. Pressure modifier passage 8 is laterally extended by a transverse passage 9. A plunger 10 is mounted for reciprocating movement in passage 9. Plunger 10 is so mounted as to be reciprocable into and out of the pressure modifier passage 8. Stop members 11 and 12 are threadably secured on plunger 10 to provide adjustable means for limiting the reciprocating movement of plunger 10. The upper limit of the reciprocating movement of plunger 10 is limited by engagement of stop 11 with a stationary abutment 13. Downward reciprocating movement of plunger 10 is limited by engagement of stop 12 with a stationary abutment 14. As illustrated in FIGURE 1, abutments 13 and 14 are tubular so as to allow sliding movement of the plunger 10 therethrough.

The upper end of plunger 10 may be affixed to a piston 15 housed within a cylinder 16. A fluid port 17 is provided at the upper end of cylinder 15 while another fluid port 18 is provided at the lower end of the cylinder. A conduit 19 extends from upper port 17 to a control unit 20. A conduit 21 extends from lower port 18 to control unit 20.

Passage 8 of pressure modifier 7 terminates in an outlet 8a which communicates with the interior of a parison-forming unit 22. Parison-forming unit 22 includes a generally vertically extending bore 23 communicating with outlet 8a. A mandrel 24 is reciprocably mounted within bore 23 so as to define an annular passage. At the lower end of the illustrated mandrel 24 there is mounted an extrusion tip 25 which provides an inner surface of a parison defining outlet. An extrusion ring 26 is spaced from the tip 25 to define the outer surface of this extrusion outlet.

Tip member 25 has a downwardly facing, generally convex surface 25a. Ring member 26 includes an upwardly facing, generally concave surface 26a. An opening 27 which is of lesser diameter than tip 25 extends from concave portion 26a in axial alignment with the tip. Plastic material extruded through the apparatus and passing through the extrusion outlet defined by the tip 25 and the ring 26 will issue from the opening 27 in the form of a hollow parison in the conventional manner recognized in the art.

Reciprocating movement of mandrel 24 and its associated tip 25 is limited by stops 28 and 29 which are threadably and thus adjustably mounted upon mandrel 24. Upward movement of the mandrel 24 and tip 25 is limited by engagement of the stop 28 with a stationary, upper abutment 30. Downward reciprocating movement of mandrel 24 and tip 25 is limited by engagement of lower stop 29 with a stationary, lower abutment 31. Abutments 31 and 30 are hollow to allow sliding movement of mandrel 24 therethrough.

Reciprocating movement of the mandrel 24 and tip 25 may be effected by a piston 32 secured to the upper end of mandrel 24 and mounted within a cylinder 33. Cylinder 33 includes a fluid port 34 at its upper end and a fluid port 35 at its lower end. Fluid port 34 is connected to control mechanism 20 through conduit 36 while port 35 is connected to this control mechanism through conduit 37.

Control unit 20 may be any conventional control mechanism, either mechanical, electrical, pneumatic or hydraulic in nature, designed to selectively control the application of fluid pressure to ports 17, 18, 34 and 35. When fluid pressure is applied to port 17 in cylinder 16, port 18 will function as an exhaust port, with the converse being true when fluid pressure is applied to port 18. Similarly, in cylinder 33, when fluid pressure is applied to port 34, fluid is exhausted from the port 35, while fluid is exhausted from the port 34 when fluid pressure is applied to the port 35. The sequence of application of fluid pressure to the ports 17, 18, 34, or 35 may be selectively controlled by a conventional timing mechanism incorporated in control 20.

In lieu of the illustrated, fluid pressure actuated piston system for motivating the plunger 10 and the mandrel 24, a conventional cam driving mechanism may be employed. Such a cam mechanism incorporated with the plunger 10 is illustrated in FIGURE 2. The upper end of plunger 10 is provided with a roller-type cam follower 38. Plunger 10 is resiliently urged upwardly by a coil spring 39 engaging an enlargement 40 at its upper end. A cam 41 is mounted on a shaft 42 above and in peripheral engagement with cam follower 38. Shaft 42 may be driven by a conventional drive unit 43 coupled with a transmission mechanism 44 to a conventional control unit 45. Control unit 45 would correlate the operation of the cam 41 with respect to the operation of the remainder of the extrusion apparatus so as to effect appropriately timed reciprocating operation of plunger 10. As is apparent, a similar cam mechanism may be employed in connection with the operation of mandrel 24.

Reviewing the appartus in overall perspective it will be appreciated that at the left end of illustrated screw 5 there is provided a source of plastic material. At the opposite end of the appartus an extrusion outlet is defined by cooperating ring 26 and tip 25. Plasticizer passage 4, pressure modifier passage 8 including lateral passage 9, connecting passage 8a, and the annular passage encircling mandrel 24 afford a continuously open feed cavity for maintaining communication between the plastic material being fed and the extrusion outlet 27.

The worm screw 5 comprises a mechanism for applying an initial pressure to the mass of plastic material being fed to the extrusion outlet to initiate its flow through the feed cavity. A conventional drive mechanism associated with the worm screw 5 is operated at constant speed with a conventional drive and transmission mechanism so as to maintain a continuous flow of plastic material entering the continuously open cavity. Through the reciprocable plunger 10, which effects size of the feed cavity, means are provided for selectively varying the capacity of this cavity. The reciprocable nature of the tip 25 enables the inner surface of the extrusion outlet and the outer surface of this outlet to be relatively varied in position.

With the extrusion screw 5 continuously operating, movement of the plunger 10 is effective to change the rate at which plastic material reaches the extrusion outlet and the pressure at which material is extruded through the outlet to form a hollow parison. When plunger 10 is moved downwardly, the size of the cavity interconnecting the plastic mass being fed and the extrusion outlet is reduced. This reduction in size results in an increase in the rate at which material reaches the extrusion outlet and a corresponding increase in extrusion pressure. Conversely, when the plunger 10 is raised and moved out of the feed cavity, the cavity is enlarged so as to diminish the rate at which plastic material reaches the extrusion outlet and reduce the pressure at which it is extruded between the tip 25 and the ring 26.

The reduction in cavity size which is accompanied by an increase in extrusion pressure is reflected by an increase in parison outside diameter and parison wall thickness. When the cavity is enlarged by upward movement of the plunger 10, the resulting reduction in extrusion pressure effects a diminishing of parison outside diameter and wall thickness.

Movement of the tip 25, which defines the inner parison surface, affects the inside parison diameter. Upward movement of the tip 25 causes a decrease in parison inside diameter and is accompanied by an increase in wall thickness. Downward movement of the tip 25 restricts the flow of plastic material through the extrusion outlet and causes an increase in parison inside diameter and parison wall thinning.

*Control of parison outside diameter and parison wall thickness*

Many commercial articles which are blow molded are of such an irregular shape as to require variations in the geometric properties of particular parison portions. For example, it may be desirable to thicken the lower side wall and base of certain containers or to produce a restricted closure receiving portion for containers.

FIGURES 3 through 6 illustrate modifications of seleced parison portions which are designed to accommodate to particular article requirements. The lowermost portion of the extruded parison shown in FIGURE 3 has an outside diameter and wall thickness of normal geometric properties. A cross-sectional view through the parison in this area is shown in FIGURE 4. A subsequently extruded parison portion has a reduced outside diameter and a correspondingly reduced wall thickness as shown in FIGURE 5. This reduction in outside diameter and in wall thickness is accomplished by raising the plunger 10 while leaving the tip 25 stationary. To accomplish the abrupt thinning, as illustrated in FIGURE 3, plunger 10 is rapidly raised. After plunger 10 has been raised it may be gradually restored to its normal or neutral position. This gradual restoration will result in a gradual increase in parison outside diameter to return to a normal parison outside diameter and wall thickness as shown in the cross-sectional view of FIGURE 4.

An abrupt enlargement of the parison outside diameter accompanied by an abrupt increase in parison wall thickness is effected by a rapid or abrupt downward movement of the plunger 10. This enlargement is illustrated in FIGURES 3 and 6. A gradual upward restoration of the plunger 10 to its normal position will result in a gradual thinning of the parison outside diameter and wall thickness so as to restore the normal parison configuration illustrated in FIGURE 4.

In each of the parison modifications shown in FIGURE 3, the dimensional changes were effected solely by movement of the plunger 10. Although, for many purposes, such modifications may be adequate, it may be desirable to effect changes in internal parison diameter so as to modify the thickness of the parison wall. For example, it may be desired to produce a parison portion having an enlarged outside diameter in which the parison wall thickness remains substantially constant. Alternatively, it may be desired to reduce the parison outside diameter while retaining a constant parison wall thickness. Such objectives are achieved by manipulating the tip 25 concurrently with the operation of the plunger 10 so as to simultaneously obtain changes in parison internal diameter and parison outside diameter. Such interrelated manipulations of the plunger 10 and the tip 25 are illustrated in FIGURES 7 through 11.

Figure 7:
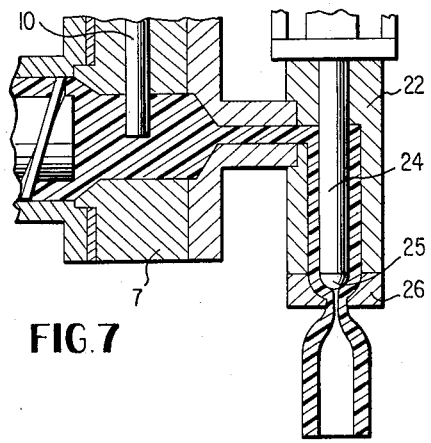
FIGURES 7 through 11 are sectional views illustrating various modes of operation of the apparatus shown in FIGURE 1.
Figure 8:
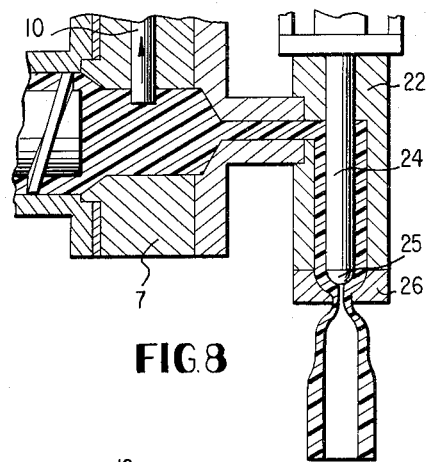
Figure 9:
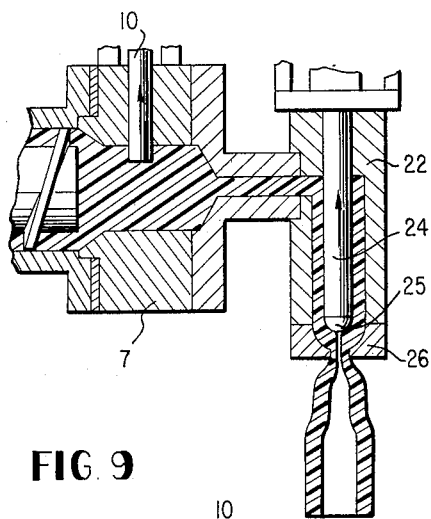

In FIGURE 7 a parison is shown being extruded while the plunger 10 and tip 25 occupy a normal or standard position. In FIGURE 8 extrusion is being conducted while the plunger 10 is moving upwardly, so as to reduce the extrusion pressure. As illustrated in FIGURE 8, this movement of the plunger 10 has resulted in a reduction in parison outside diameter and an accompanying parison wall thinning. In order to maintain the parison wall of constant thickness while effecting a reduction in an outside diameter, the tip 25 is moved upwardly while the plunger 10 is being withdrawn from the cavity portion 8. This concurrent upward movement of the plunger 10 and the tip 25 causes a simultaneous reduction in parison outside and inside diameter so as to maintain a constant parison wall thickness, as illustrated in FIGURE 9.

Figure 10:
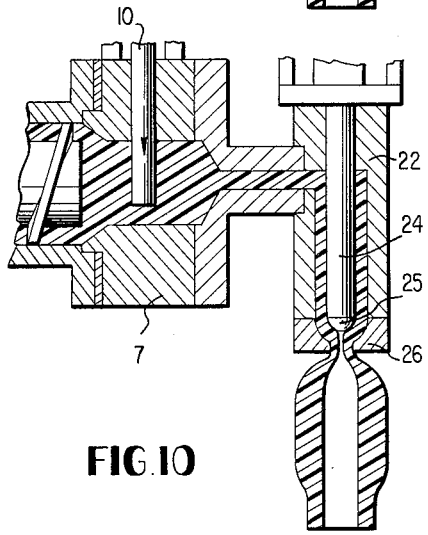
Figure 11:
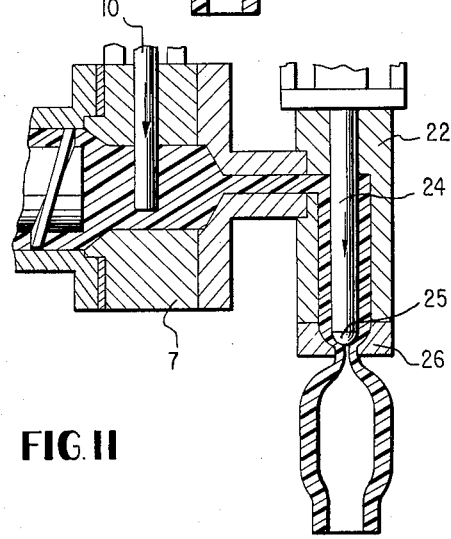

In FIGURE 10 an extrusion operation is illustrated where the plunger 10 is moving downwardly to cause an increase in extrusion pressure. This increase in extrusion pressure has caused an increase in parison outside diameter and an increase in parison wall thickness. To offset the increase in parison wall thickness, the tip 25 may be moved downwardly with the plunger 10 as illustrated in FIGURE 11. The concurrent downward movement of the tip 25 is effective to enlarge the parison inside diameter so as to offset the parison wall thickening induced by the increase in parison outside diameter.

The advantages achieved by the simultaneous operation of the plunger 10 and the tip 25 are material. For example, the simultaneous upward movement of the tip 25 and the plunger 10, as illustrated in FIGURE 9, produces a necking-in of the parison while maintaining a substantially constant parison wall thickness. This enables the obtaining of a necked-in parison portion which is particularly suited for forming restricted or necked-in article portions. With this technique, flash caused by closing mold sections may be minimized but not at the expense of reducing the thickness of the article wall. As will be appreciated, this advantage is of particular consequence when forming container neck or closure receiving portions.

The enlarged constant wall thickness parison portion shown in FIGURE 11 is advantageously employed in forming large diametered article portions. With this form of parison, the differences in parison distortion produced during the parison expanding operation are minimized.

*Control of parison shape*

A particularly significant feature of the invention resides in the mechanism and technique by means of which axially spaced portions of an extruding parison may be formed so as to have different geometric shapes.

In FIGURE 12 there is schematically illustrated a modified form of the extrusion outlet of the FIGURE 1 structure by means of which a parison internal wall configuration may be caused to change from a circular to a generally oval shape during a continuous extrusion process. The apparatus illustrated includes a parison forming unit 46, corresponding to the unit 22 of the FIGURE 1 structure, which unit defines a generally vertically extending annular passage 47. A ring-like member 48 is threadably secured to the lower end of unit 46. Ring member 48 includes a portion 49 which defines a generally circular extrusion orifice, i.e. outlet 50. A lower extremity 51 of ring member 48 projects downwardly from the orifice defining portion 49. An annular wall 52 of ring extremity 51 defines a cavity 53 of circular cross-section extending outwardly from extrusion orifice 50. As is apparent from the FIGURE 12 illustration, this cavity 53 has a diameter exceeding that of the orifice 50 to accommodate normal parison expansion subsequent to extrusion. Conventional, parison severing means such as a blade B may be mounted at the outer end of cavity 53 to reciprocate across the cavity adjacent the end of wall 52.

A composite tip member 54 is mounted for reciprocating axial movement relative to the orifice 50. Tip member 54, which may be selectively actuated by control mechanisms such as those previously described, includes axially spaced portions of different geometric shapes. A first, outermost portion 55 has a generally elongate, cross-sectional configuration. The outermost tip portion 55 is formed by the intersection of generally planar surfaces 55a and 55b with a cylindrical wall 55c. Walls 55a and 55b may be flat or slightly curved as illustrated. These walls may be formed, if desired, by conventional filing techniques. The tip cross-section produced by such filling is characterized by substantially straight side walls 55d and outwardly curving end walls 55e as shown in FIGURES 13 and 14.

A second or intermediate portion 56 of the tip member is of uniform circular, cross-sectional configuration. This intermediate portion 56 of the FIGURE 12 tip structure is defined by the wall 55c.

The third inner portion 57 of the tip is also of circular, cross-sectional configuration. This portion, however, is generally convex in character such that the cross-sectional configuration enlarges in a progressively varying fashion axially upwardly along the tip member 54.

The intermediate tip portion may be of the same diameter as the maximum diameter of the outer tip portion 55 as illustrated in FIGURE 12. Alternatively, the intermediate tip portion may have a diameter less than that of the maximum diameter of the outer tip portion 55, as represented by the intermediate tip portion 58 illustrated in FIGURE 13. The intermediate tip portion may also be configured as represented by the tip portion 59 as shown in FIGURE 14 so as to have a diameter larger than the maximum diameter of the outer tip portion 55.

With the ring and tip arrangement illustrated in FIGURE 12, a parison may be extruded having axially spaced portions wherein the inner wall cross-sectional configuration is alternately oval and circular.

When the tip 54 is positioned so that the outermost tip portion 55, which is of elongate cross-sectional configuration, cooperates with the circular orifice defining ring portion 49, a parison cross-sectional configuration, as shown in FIGURE 15, results when plastic is extruded. After extruding a parison having a cross-section as shown in FIGURE 15, the tip 54 may be lowered so as to cause the intermediate portion 56, which has a circular cross-section, to cooperate with the orifice defining ring portion 49. With the tip positioning, there would be extruded a parison portion having a cross-sectional configuration as shown generally, but in somewhat enlarged form, in FIGURE 4. This parison portion would have an inner and outer wall of circular, cross-sectional configuration. Should it be desired to extrude a parison having an enlarged inside diameter, the tip member 54 may be further lowered to cause the inner tip portion 57 to cooperate with the orifice defining ring portion 49. The enlarged size of this portion of the tip, in relation to the intermediate tip portion 56, would cause an increase in parison inside diameter. With the tip projecting into and terminating within the cavity 53, parison severing may be accomplished by blade B without fear of tip and blade engagement.

The tip structures illustrated in FIGURES 13 and 14 are useful for obtaining variations in the internal diameter of circular parison portions. For example, the intermediate portions 58 illustrated in FIGURE 13 would produce a parison cross-section in which the inner wall would have a diameter less than that formed by the intermediate tip portion 56 of the FIGURE 12 structure. Conversely, the intermediate tip portion 59 shown in the FIGURE 14 tip structure would produce an increased internal wall diameter in an extruding parison, in relation to the parison internal diameter produced by the intermediate portion 56 of the FIGURE 12 structure.

The tip portion 55, which is characterized by an elongate cross-sectional configuration, may be used in conjunction with the plunger 10 to obtain selective and deliberate parison distortions suited to particular molded article requirements. With the tip 54 positioned so as to cause the outermost portion 55 to cooperate with the orifice defining ring portion 49, the plunger 10 may be manipulated so as to selectively distort a parison portion having a cross-section as shown in FIGURE 15. This cross-section is characterized by side portions having a width $a$ which is substantially greater than the width $b$ of the cross-section end portions. In other words, a quadrant such as $xoy'$ shown in FIGURE 15 has a mid-portion, the width of which exceeds that of the maximum width of any portion of the adjacent quadrants $yox$ and $y'ox'$. As is apparent, these dimensional characteristics are attributable to the annular opening formed by the tip portion 55 and ring portion 49 which cooperate to produce this particular parison configuration.

If, after extruding a portion having a cross-section as shown in FIGURE 15, the plunger 10 should be moved downwardly, an increase in extrusion pressure would result. This increase in extrusion pressure will cause an enlargement in parison outside diameter. In addition, it has been discovered that this pressure increase will cause an alteration in the shape of the generally oval shaped, internal parison wall. An elongation of the oval configuration will result in response to the extrusion pressure increase which will cause an increase in the ratio of the thickness *a* of the side wall portion shown in FIGURE 15, as compared to the thickness *b* of the end wall portion.

*Advantages of the invention*

A principal advantage attributable to the technique under consideration resides in the ability to effect changes in parison size and wall thickness while a continuous extrusion operation is taking place. There is no necessity of resorting to intermittent feed techniques which are time consuming and produce undesirable parison effects.

The disclosed plunger mechanism for modifying the size of the cavity which interconnects a source of plastic material and an extrusion outlet may be readily manipulated with only nominal power requirements. It is entirely unnecessary to affect the operation of a main pressurization mechanism such as a worm screw. Any attempt to produce pressure changes by varying the operation of an extrusion screw would impose excessive power requirements and create undue structural complexity.

A further advantage residing in the present technique involves the ability to obtain prompt extrusion pressure changes in the vicinity of the extrusion outlet. With the pressure modifying structure being located immediately adjacent the extrusion head, pressure changes are nearly instantaneously transmitted to the extrusion outlet in response to changes in plunger position. Such prompt response could not be achieved through variations in the operation of an extrusion screw. The viscous nature of the material being extruded would materially impede the transmission of pressure changes through the entire extrusion cavity. With the time lag which inherently would be involved in such a pressure changing operation, it would be virtually impossible to consistently and accurately control the location and extent of parison modifications.

The structurally simple and easily manipulatable nature of the disclosed mechanism for producing extrusion pressure changes is of considerable importance. Its operation may be effected with only nominal power requirements, with only nominal modifications of existing extrusion equipment, and with any of a wide variety of conventional and relatively inexpensive control mechanisms. Semi-skilled personnel would readily comprehend the operation of the mechanism and be competent to operate an extrusion apparatus in which it was incorporated.

The advantages attributable to the composite tip structure are particularly significant. By employing such a structure, the basic character of the parison shape may be altered while the extrusion process is continuing. The necessity for interrupting the extrusion operation so as to change extrusion tips is entirely avoided.

The value of the disclosed parison severing arrangement is apparent. The provision of a wall defined cavity projecting outwardly from the extrusion orifice enables parison severing to take place while a tip portion projects into the cavity, with there being no danger of engagement between the tip and the severing device. In this manner tip and severing device damage are positively prevented.

The use of the tip portion having an elongated cross-section in a continuous extrusion apparatus provided within pressure changing means such as the plunger 10 is also uniquely advantageous. With the tip being stationary, the parison configuration may be selectively altered or distorted to meet particular article requirements merely through the operation of the plunger 10.

While the apparatus disclosed in the invention has been described with reference to preferred embodiments, certain modifications will readily occur to those skilled in the extruding arts. For example, a plasticizing structure other than the structure schematically illustrated may be employed. In lieu of a plunger as a means for changing the size of a cavity communicating a mass of pressurized plastic with an extrusion outlet, a variety of other structural alternatives may be utilized. For example, a wall portion of the cavity may be made selectively expansible or contractable so as to produce desired changes in cavity capacity.

The plunger 10 and mandrel 24 in the preferred embodiment are contemplated as being of circular cross-section. Similarly, the extrusion tip 25 and the extrusion ring 26 are shown as having circular, cross-sectional configurations and as having cooperating convex and concave portions. However, depending upon particular extrusion requirements, these shapes, as well as the other various disclosed extrusion tip shapes, may be varied.

While relative changes in the position of the tip and ring have been shown to be accomplished by tip movement, it is possible to achieve similar results with ring movement or joint ring and tip movement.

Other modifications may readily occur to practitioners in the extrusion art which would be well within the scope of the invention as defined in the appended claims.

We claim:

1. An apparatus for extruding a generally tubular formation of plastic material through an extrusion outlet defined by spaced surface means, said apparatus comprising:

means defining a cavity providing continuous communication between a mass of plastic material and said extrusion outlet;

means for applying an initial pressure to said mass of plastic material to initiate its flow through said cavity and for continuously maintaining an application of initial pressure so as to maintain a continuous flow of material entering said cavity;

first means for varying the capacity of said cavity so as to vary the rate at which said material reaches said outlet and the pressure at which said material is extruded therethrough to form a parison while the capacity of said cavity is being varied so as to affect the external size of said parison;

second means for varying the positional relationship of the surface means defining said outlet while the capacity of said cavity is being varied so as to affect the internal size of said parison; and control means for causing the simultaneous operation of said first and second means during a portion of the period during which a parison is being extruded so as to simultaneously affect the external size and internal size of a portion of said parison.

2. An apparatus for selectively varying the pressure at which plastic material is extruded in tubular form through an outlet, said apparatus comprising:

a source of plastic material;

spaced surface means defining an extrusion outlet;

a cavity including continuously open passage means connecting said source and said outlet;

feeding means for continuously applying initial pressure to a mass of plastic material at said source to initiate its flow through said cavity toward said extrusion outlet;

means for operating said feeding means at a substantially constant rate;

first means for varying the capacity of said cavity so as to vary the rate at which said material reaches said outlet and the pressure at which said material is extruded therethrough to form a parison while the capacity of said cavity is being varied so as to affect the external size of said parison;

second means for varying the relative positions of the spaced surface means defining said outlet while the capacity of said cavity is being varied so as to affect the internal size of said parison; and control means for causing the simultaneous operation of said first and second means during a portion of the period during which a parison is being extruded so as to simultaneously affect the external size and internal size of a portion of said parison.

3. An apparatus as recited in claim 2 wherein said control means is adapted to cause said second means to operate to so affect the external size of a portion of a parison as to maintain a substantially constant parison wall thickness while the external size of a portion of said parison is being changed by the operation of said first means.

4. An apparatus as described in claim 2 wherein said extrusion outlet comprises an annular opening, at least one quadrant of which has a portion, the width of which exceeds that of at least one adjacent quadrant.

5. An apparatus as described in claim 2 wherein:

said spaced surface means comprises ring means defining an extrusion orifice, mandrel means including tip means, said mandrel means being mounted for reciprocating axial movement relative to said extrusion orifice so that said tip means cooperates with said ring means to define an annular extrusion outlet; and said apparatus further including wall means defining a cavity extending outwardly from said extrusion orifice, said cavity being larger in cross-section than said extrusion orifice; and severing means adapted to move transversely across the outer end of said cavity to sever an extruding parison, said severing means being adapted to sever said parison while said tip means is projecting through said orifice into said cavity.

6. An apparatus as described in claim 2 wheerin said means for varying the relative positions of the surface means of said extrusion outlet comprises: housing means including an orifice defining member; and a composite tip member mounted in said housing means for reciprocating axial movement relative to said defined orifice; said tip member including a portion of noncircular, cross-sectional configuration and another portion of circular, cross-sectional configuration, each of said tip member portions being adapted to individually cooperate with said defined orifice to form a parison.

7. An apparatus as described in claim 2 wherein said means for varying the relative position of said surface means of said extrusion comprises: housing means including an orifice defining member; and a composite tip member mounted in said housing means for reciprocating axial movement relative to said defined orifice, said tip member including: a first, outer portion of axially varying, elongate, cross-sectional configuration, a second intermediate portion of uniform, circular, cross-sectional configuration, and a third, inner portion of axially varying, circular, cross-sectional configuration; each of said tip member portions being adapted to individually cooperate with said defined orifice to form a parison.

8. An apparatus as described in claim 7 wherein the cross-sectional configuration of said first, outer portion of said tip member includes substantially straight side portions and outwardly curving, end portions.

9. An apparatus for extruding a tubular formation of plastic material through an outlet, said apparatus comprising:

a source of plastic material;

housing means connected with said source;

an extrusion outlet, said outlet including a ring member supported by said housing means and mandrel means including a tip member, said mandrel means being mounted on said housing means for reciprocating axial movement relative to said ring member, said tip member having a downwardly facing, generally convex portion and said ring member having an upwardly facing, generally concave portion spaced below said generally convex tip portion, said ring member further including a bore of lesser diameter than said tip, which bore extends from said concave ring portion in axial alignment with said tip;

said housing means defining a continuously open passage connecting said source and said outlet;

screw means within said passage for continuously applying an initial pressure to a mass of plastic material to initiate its flow through said passage toward said extrusion outlet;

drive means for operating said screw means at a substantially constant rate;

wall means in said housing means defining a recess extending transversely of and communicating with said passage;

a plunger mounted for reciprocating movement within said recess; and first operating means mounted on said housing means for causing said reciprocating movement of said tip member;

second operating means mounted on said housing means for causing said reciprocating movement of said plunger;

control means for causing the simultaneous operation of said first and second operating means during a portion of the period during which a parison is being extruded so as to simultaneously reciprocate said tip member and plunger and thereby simultaneously affect the external size and internal size of a portion of said parison.

10. An apparatus as recited in claim 9 wherein said recess and plunger are disposed between said screw means and said outlet in close proximity to said outlet.

References Cited by the Examiner

UNITED STATES PATENTS

| Re. 24,577 | 12/1958 | Haines | 18—5 |
|---|---|---|---|
| 3,019,480 | 2/1962 | Soubren | 18—5 |
| 3,019,481 | 2/1962 | Negoro | 18—5 |
| 3,023,461 | 3/1962 | Sherman. | |
| 3,029,471 | 4/1962 | Adams et al. | 18—5 |
| 3,052,916 | 9/1962 | Campbell | 18—5 |
| 3,054,143 | 9/1962 | Stenger | 18—5 |
| 3,069,727 | 12/1962 | Schramek | 18—55 |
| 3,078,507 | 2/1963 | Park | 18—5 |
| 3,079,631 | 3/1963 | Gasmire | 18—5 |
| 3,085,292 | 4/1963 | Kindseth | 18—55 |
| 3,088,167 | 5/1963 | Corbett | 18—14 |
| 3,090,995 | 5/1963 | Amsden | 18—14 |
| 3,114,932 | 12/1963 | Donelly | 18—5 |
| 3,127,637 | 4/1964 | Rex | 18—5 |

FOREIGN PATENTS 610,736  10/1960  Italy.

WILLIAM J. STEPHENSON, *Primary Examiner.*

MORRIS LIEBMAN, MICHAEL V. BRINDISI,
*Examiners.*